US008560356B2

(12) United States Patent  
DeMarcken et al.

(10) Patent No.: US 8,560,356 B2
(45) Date of Patent: Oct. 15, 2013

(54) METHOD AND APPARATUS FOR PROVIDING AVAILABILITY OF AIRLINE SEATS

(75) Inventors: Carl G. DeMarcken, Seattle, WA (US); Gregory R. Galperin, Boston, MA (US)

(73) Assignee: Google Inc., Mountain View, CA (US)

( * ) Notice: Subject to any disclaimer, the term of this patent is extended or adjusted under 35 U.S.C. 154(b) by 739 days.

(21) Appl. No.: 12/194,592

(22) Filed: Aug. 20, 2008

(65) Prior Publication Data

US 2008/0312977 A1 Dec. 18, 2008

Related U.S. Application Data

(60) Division of application No. 10/098,580, filed on Mar. 15, 2002, now Pat. No. 8,239,219, which is a continuation of application No. 09/244,905, filed on Feb. 4, 1999, now Pat. No. 6,418,413.

(51) Int. Cl.
*G06Q 10/00* (2012.01)

(52) U.S. Cl.
USPC .................................................. 705/5

(58) Field of Classification Search
USPC .......................................... 705/5; 707/1–206
See application file for complete search history.

(56) References Cited

U.S. PATENT DOCUMENTS

| 3,622,995 | A |   | 11/1971 | Dilks et al. |
| 4,783,752 | A | * | 11/1988 | Kaplan et al. .................. 706/48 |
| 4,862,357 | A |   | 8/1989 | Ahlstrom et al. |
| 5,161,225 | A |   | 11/1992 | Abraham et al. |
| 5,237,499 | A |   | 8/1993 | Garback |
| 5,261,069 | A |   | 11/1993 | Wilkinson et al. |
| 5,270,921 | A |   | 12/1993 | Hornick |
| 5,305,389 | A |   | 4/1994 | Palmer |
| 5,490,261 | A |   | 2/1996 | Bean et al. |
| 5,570,283 | A |   | 10/1996 | Shoolery et al. |
| 5,652,867 | A |   | 7/1997 | Barlow et al. |
| 5,758,149 | A |   | 5/1998 | Bierma et al. |
| 5,781,892 | A |   | 7/1998 | Hunt et al. |
| 5,805,809 | A |   | 9/1998 | Singh et al. |
| 5,809,493 | A | * | 9/1998 | Ahamed et al. ................. 706/52 |
| 5,828,823 | A |   | 10/1998 | Byers et al. |
| 5,832,453 | A |   | 11/1998 | O'Brien |
| 5,832,454 | A |   | 11/1998 | Jafri et al. |
| 5,839,114 | A |   | 11/1998 | Lynch et al. |
| 5,889,993 | A |   | 3/1999 | Kroeger et al. |

(Continued)

FOREIGN PATENT DOCUMENTS

EP 0 713 183 A2 5/1996
EP 0 471 282 A2 2/2002

(Continued)

OTHER PUBLICATIONS

Foley, John, Sabre's Challenge, Aug. 1997, Information Week, pp. 83-86.

(Continued)

*Primary Examiner* — Shannon Campbell
(74) *Attorney, Agent, or Firm* — Fish & Richardson P.C.

(57) ABSTRACT

A computer program product, method and system for producing seat availability information for a mode of travel such as airline travel produce a prediction of availability of a seat in accordance with an availability query. The prediction is used in place of making an actual query to an airline or other travel mode availability system.

35 Claims, 9 Drawing Sheets

(56) References Cited

U.S. PATENT DOCUMENTS

| | | | |
|---|---|---|---|
| 5,897,620 | A | 4/1999 | Walker et al. |
| 5,918,209 | A | 6/1999 | Campbell et al. |
| 5,948,040 | A | 9/1999 | DeLorme et al. |
| 5,983,200 | A | 11/1999 | Slotznick |
| 5,983,217 | A | 11/1999 | Khosravi-Sichani et al. |
| 5,983,220 | A | 11/1999 | Schmitt |
| 5,999,946 | A | 12/1999 | Bailis et al. |
| 6,012,052 | A | 1/2000 | Altschuler et al. |
| 6,018,715 | A | 1/2000 | Lynch et al. |
| 6,023,679 | A | 2/2000 | Acebo et al. |
| 6,085,164 | A | 7/2000 | Smith et al. |
| 6,085,169 | A | 7/2000 | Walker et al. |
| 6,085,193 | A | 7/2000 | Malkin et al. |
| 6,098,064 | A | 8/2000 | Pirolli et al. |
| 6,112,185 | A | 8/2000 | Walker et al. |
| 6,119,094 | A | 9/2000 | Lynch et al. |
| 6,122,642 | A | 9/2000 | Mehovic |
| 6,128,701 | A | 10/2000 | Malcolm et al. |
| 6,134,534 | A | 10/2000 | Walker et al. |
| 6,157,930 | A | 12/2000 | Ballard et al. |
| 6,263,315 | B1 | 7/2001 | Talluri |
| 6,263,323 | B1 | 7/2001 | Baggett |
| 6,307,572 | B1 | 10/2001 | DeMarcken et al. |
| 6,360,205 | B1 | 3/2002 | Iyengar et al. |
| 6,377,932 | B1 | 4/2002 | DeMarcken |
| 6,381,578 | B1 | 4/2002 | DeMarcken |
| 6,411,897 | B1 | 6/2002 | Gaspard, II |
| 6,418,413 | B2 | 7/2002 | DeMarcken et al. |
| 6,418,438 | B1 | 7/2002 | Campbell |
| 6,542,964 | B1 | 4/2003 | Scharber |
| 6,609,098 | B1 | 8/2003 | DeMarcken |
| 6,658,390 | B1 | 12/2003 | Walker et al. |
| 6,721,714 | B1 | 4/2004 | Baiada et al. |
| 6,839,679 | B1 | 1/2005 | Lynch et al. |
| 6,934,717 | B1 * | 8/2005 | James .................................. 1/1 |
| 6,974,079 | B1 | 12/2005 | Strothmann et al. |
| 7,302,399 | B1 | 11/2007 | Donovan et al. |
| 7,328,166 | B1 | 2/2008 | Geoghegan et al. |
| 7,487,103 | B2 | 2/2009 | Feyder |
| 7,533,032 | B1 | 5/2009 | Selby |
| 7,676,546 | B2 | 3/2010 | Hallam-Baker |
| 7,693,750 | B2 | 4/2010 | Christensen |
| 2001/0042026 | A1 | 11/2001 | Hinh et al. |
| 2002/0133382 | A1 | 9/2002 | DeMarcken et al. |
| 2003/0120727 | A1 | 6/2003 | Mentchoukov |
| 2003/0167307 | A1 | 9/2003 | Filepp et al. |
| 2004/0249682 | A1 | 12/2004 | DeMarcken et al. |
| 2004/0249683 | A1 | 12/2004 | Demarcken et al. |
| 2005/0177402 | A1 | 8/2005 | Walker et al. |
| 2005/0228702 | A1 | 10/2005 | Fairbanks et al. |
| 2005/0262059 | A1 | 11/2005 | White |
| 2006/0149713 | A1 | 7/2006 | Walker |
| 2006/0200370 | A1 | 9/2006 | Ratliff et al. |
| 2006/0265361 | A1 | 11/2006 | Chu |
| 2009/0234682 | A1 | 9/2009 | Baggett et al. |

FOREIGN PATENT DOCUMENTS

| | | |
|---|---|---|
| JP | 07230509 A | 8/1995 |
| WO | WO 97/32268 | 4/1997 |
| WO | WO 97/21177 | 12/1997 |
| WO | WO 98/45978 | 10/1998 |
| WO | WO 99/01822 | 1/1999 |
| WO | WO 99/03029 | 1/1999 |
| WO | WO 00/43927 | 7/2000 |
| WO | WO 00/46715 | 8/2000 |
| WO | WO 01/33472 | 5/2001 |

OTHER PUBLICATIONS

Feldman, Joan, "Chasing the Rational Marketplace", Air Transport World Dec. 1998 vol. 35 Issue 12 p. 32, 2P.

Zheng Wang, Jon Crowcroft. "Prefetching in World Wide Web." Proceedings of Global Internet IEEE, Nov. 1996, pp. 28-32.

Smith, Neil G. "The UK national Web cache—The state of the art." Computer Networks and ISDN Systems, vol. 28, No. 7, May 1996, pp. 1407-1414.

Zhimei Jiang, Leonard Kleinrock. "Prefetching Links on the WWW" Communications, vol. 1. 1997, pp. 483-489.

Ken-ichi Chinen, Suguru Yamaguchi, "An Interactive Prefetching Proxy Server for Improvement of WWW Latency." Proceedings of the Seventh Annual Conference of the Internet Society (INET'97), Kuala Lumpur, Jun. 1997.

Mark L. Van Name and Bill Catchings, "Proxy Servers Will Change the Web." PC Week, vol. 13 No. 15, Apr. 1996.

EP Examination Report for European Application No. 00911699.7 dated Jul. 29, 2008.

Travelocity.com Launches Fare Search Technology on New Platform. Travelocity.com News Release [online], Jan. 2001 [retrieved on Jan. 22, 2001]. Retrieved from the Internet: <http://www.corporateir.net/ireye/ir_site.zhtml?ticker=TVLY&script=410&layout=7&item_id=145745.

Authorized officer Peggy Tariq R. Hafiz, International Preliminary Examination Report in PCT/US00/02698, mailed Feb. 22, 2001, 4 pages.

Authorized officer Antoniu Marcu, Examination Report in EP 00 911 699.7-1238, mailed Dec. 16, 2002.

Authorized officer Lee W. Young, International Search Report and The Written Opinion of the International Searching Authority for International Application No. PCT/US08/50186, mailed Nov. 3, 2008, 6 pages.

Authorized officer Nora Linder, International Preliminary Report on Patentability in PCT/US2008/050186, mailed Nov. 26, 2009, 6 pages.

Johnston, Marsha W., "Amadeus Takes on Sabre", Jun. 1993, Software Magazine, vol. 13, issue 9, p. 36.

"Fly with the OAG Electronic Edition", Oct. 1984, Retrieved from Dialog Chronolog (File No. 410).

"Travel Industry Embraces Internet Travel Network as a Leading Web-Based Solution", Jul. 22, 1996, Business Wire.

Baglino, Ken, "Hoteliers Report Advances in Booking Systems", Jun. 21, 1993, Tour & Travel, p. 34.

Authorized officer Selwa Harris, International Search Report in PCT/US00/41653, mailed Apr. 7, 2003, 7 pages.

Authorized officer Morice, B, International Preliminary Examination Report in PCT/US00/41653, mailed Sep. 26, 2003, 3 pages.

Guntner, Learning Apollo: Basic and Advanced Training, 1994, Delmar Publishers, pp. 3-6, 47-52, 59-63, 67-74, 85-90, 33 pages.

Robinson, John T., Devarakonda, Murthy V., "Data Cache Management Using Frequency-Based Replacement", ACM SIGMETRICS Performance Evaluation Review, vol. 18, Issue 1 (May 1990), pp. 134-142.

Authorized officer Roger Thomas, International Search Report in PCT/US00/41659, mailed Jun. 5, 2001, 7 pages.

Authorized officer Platzer, C, International Preliminary Examination Report from European Patent Office in PCT/US00/41659, mailed Feb. 19, 2002, 7 pages.

Kling et al., "Hub-dominated airports: an empirical assessment of challenger strategies." Logistics and Transportation Review, v27, n3, p. 203, Sep. 1991.

Authorized officer Tariq Hafiz, International Preliminary Examination Report in PCT/US01/41363, mailed Oct. 10, 2003, 6 pages.

Authorized officer Tariq Hafiz, International Search Report in PCT/US01/41363, mailed Dec. 26, 2001, 5 pages.

Authorized officer Tariq Hafiz, Written Opinion in PCT/US01/41363, mailed Apr. 18, 2003, 6 pages.

Authorized officer James P. Trammell, International Search Report in PCT/US00/02698, mailed May 16, 2000, 1 page.

Written Opinion in PCT/US00/41653, mailed Jul. 21, 2003, 2 pages.

* cited by examiner

METHOD AND APPARATUS FOR PROVIDING AVAILABILITY OF AIRLINE SEATS

CLAIM OF PRIORITY

This application is a divisional application and claims the benefit of priority under 35 USC §120 of U.S. patent application Ser. No. 10/098,580, filed Mar. 15, 2002, now U.S. Pat. No. 8,239,219 and entitled "Method And Apparatus For Providing Availability Of Airline Seats," which is a continuation of U.S. patent application Ser. No. 09/244,905, filed Feb. 4, 1999, now U.S. Pat. No. 6,418,413 and entitled "Method And Apparatus For Providing Availability Of Airline Seats." The disclosures of the prior applications are considered part of and are incorporated by reference in the disclosure of this application.

BACKGROUND

This invention relates generally to determining airline seat availability information for use in travel planning and travel reservation systems.

Airlines institute selling policies that can change to meet supply and demand considerations to maximize profit on any given flight. When a passenger specifies an itinerary, the itinerary has one or more flight segments. In order to issue a ticket for a single or multi-flight segment itinerary, each flight segment must be available. That is, each flight segment must have seats that have not been already reserved for other passengers. Availability can also be governed by whether an airline will sell to a particular passenger given characteristics of the passenger. Common characteristics which are used by airlines to decide whether or not to sell a ticket is the price that the passenger is willing to pay for the ticket, whether the passenger is using other flights on that airline, whether the passenger is a frequent flyer and so forth.

Generally, before booking a flight and issuing a ticket, the seller can send a request for availability information to the airline. In general, a request for availability is sent over a computer network to an airline and is processed in the airline's computer system. An answer to the request is provided from the system. Commonly, a message is returned to the seller. The message includes one or possibly a plurality of so-called booking codes that are labels used to designate different prices that an airline is willing to sell tickets at. Associated with these booking codes or labels are often a number of seats that the airline is willing to sell in each booking code. For example, a common booking code is the "Y" booking code and the message may contain Y/25 meaning the Y booking code has 25 seats. A second booking code may be the "Q" booking code and may contain a message which says Q/0 meaning that the Q booking code has 0 seats available. Although the exact meaning of booking codes may vary from carrier to carrier, in general most carriers will use Y booking codes corresponding to an expensive coach class fare and a Q booking code as an inexpensive coach class fare. The airline would make the seat at the Y booking code available, i.e., a higher profit booking code, rather than make the seat available at the Q booking code, i.e., a lower profit fare.

SUMMARY

Conventionally, travel agents and computer reservation services look-up a limited number of flight options. Thus, having an airline check on availability for those flights and asking a computer reservation service to perform a fare search for such flights involves a small number of availability checks, low latency and is generally acceptable. However, new algorithms have been produced for performing so-called "large scale" or "low fare searches" that iterate over a large number of flight possibilities and therefore would require looking up availability information and performing fare searches over the flight and available booking codes for many hundreds if not thousands of possible combinations. Since there is a computational expense, as well as an economic expense, involved in obtaining availability information, it is desirable to minimize this expense as much as possible. While it is necessary for good travel planning to look at many possible flight combinations such as hundreds or possibly thousands, it is undesirable to return to a traveler who requested such flight combinations large numbers of flights for which no seats are in fact available. Therefore, the need for availability information is present with a low fare search or large scale search algorithms. However, the current availability infrastructure does not allow for easy access to such queries which could take many minutes and possibly hours at high processing and economic costs.

According to an aspect of the invention, a computer program product residing on a computer readable medium includes instructions for causing a computer to produce a prediction of availability of a seat on an airline flight in accordance with an availability query.

The computer program product provides a prediction of availability by accessing a database of stored query answers to produce a prediction in response to the query. The computer program product can determine whether the availability query corresponds to or is similar to a query stored in the database. The product also retrieves the stored answer associated with a query stored in the database that corresponds to or is similar to availability query or otherwise send an actual availability query to the airline reservation system. The computer program product can use a model based predictor to provide a prediction of the answer to the query if there is no availability query found in the database. The computer program product can parse the availability query to produce a set of features for use by an availability model, determine features of the availability query, and apply selected ones of the determined features of the query to an availability model. The computer program product can simulate an airline's availability system to provide a predicted answer of availability. The computer program product can access a database that has probability estimates stored as a function of booking codes.

According to a further aspect of the invention, a method for providing availability information for a seat on an airline includes producing a prediction of availability of the seat in accordance with an availability query.

According to a still further aspect of the invention, a system for producing an availability answer in response to a query for airline seat availability information includes a predictor that is responsive to the query and produces an answer that corresponds to a prediction of airline seat availability.

The current process provides a technique to substitute predictions of availability for actual availability responses. Availability predictions are based upon several conceptual types of models which can be used separately or in various combinations. These models include a predictor based upon a cache or a database of stored availability queries and answers to the availability queries. The queries are used to identify when a stored query is the same as a received query request, and the answers are used as a substitute for direct access for future identical or substantially related queries.

A second approach uses predictive models of availability that are based upon parametric statistical models that use historical data, as well as, recent queries and may also include deterministic rule based models. In addition, the predicted model and the cache of available queries can be used in combination to improve the overall performance of the availability predictor.

A third approach simulates an airline's availability system or uses a direct connection to an availability process that is run as a local process to a low fare search or large scale search algorithm process. Thus, for example, a computer program is developed that simulates an airline's particular availability system. The program can be developed by using known data or system responses that can be reverse engineered. The simulated availability system can provide predicted answers to availability queries. In addition, airlines can provide their availability software for direct access by the low fare or the large scale search processes.

The availability predictor or the availability system is particularly advantageous to run as a local process to a server that performs travel planning. With such a server that produces a large number of possible flight combinations and associated fares, the availability predictor or availability system can be used to retain those pricing solutions (i.e., itinerary-fare combinations) that have a realistic chance of being available.

DESCRIPTION

Figure 1:
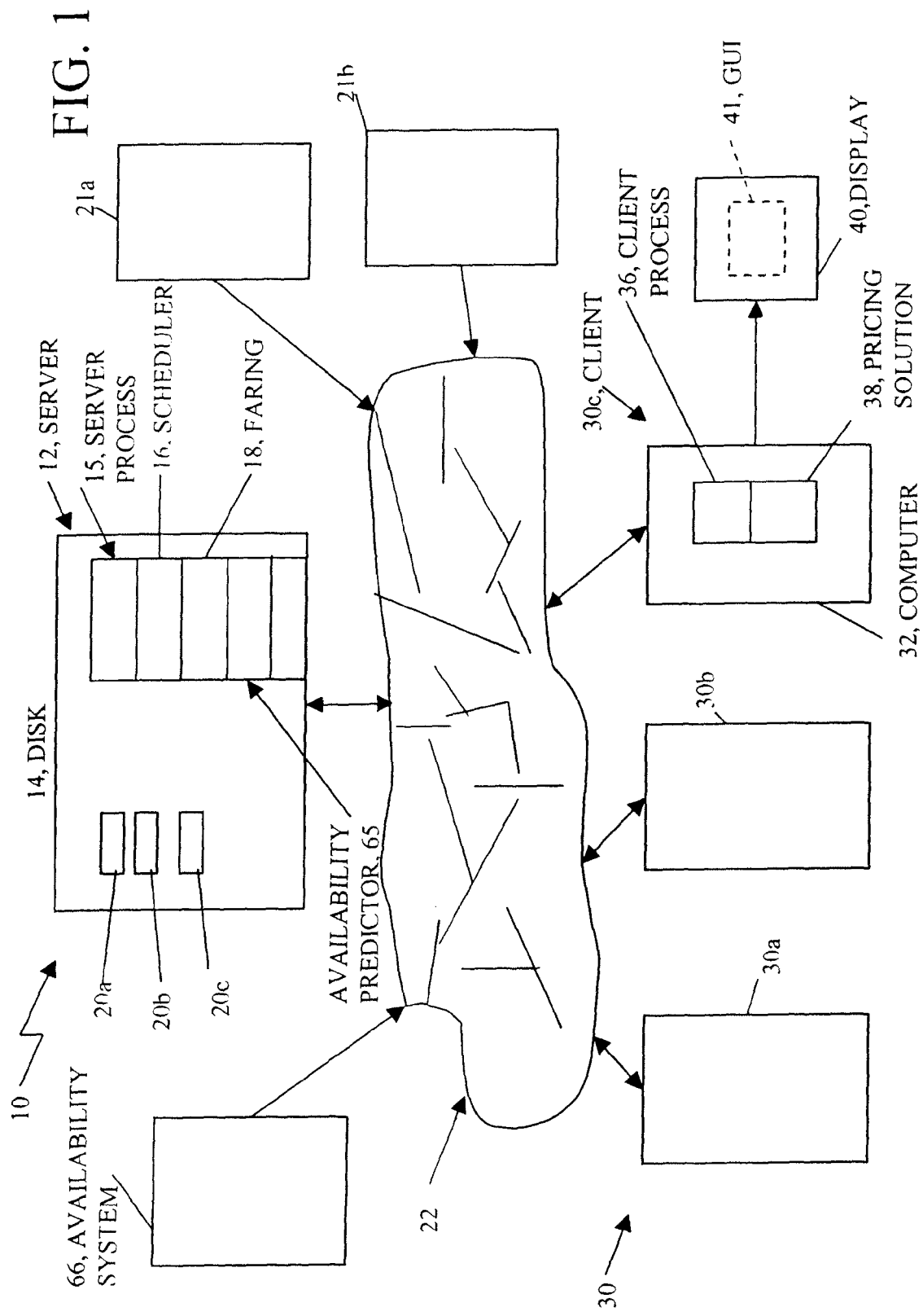
FIG. 1 is a block diagram of a client server travel planning system.

Referring now to FIG. 1, a travel planning system 10 is shown. The travel planning system 10 can be used with various forms of travel such as airline, bus and railroad and is particularly adapted for air travel. It includes a server computer 12 having a computer memory or storage media 14 storing a server process 15. The server process 15 includes a scheduler process 16 and a faring process 18. The scheduler process 16 is any scheduler process that will produce, from a travel request, sets of flights that can satisfy the request. The faring process 18 is any process that determines a set of valid fares. The server process 15 can also link a set of valid fares to flights to form a set of pricing solutions. Examples of the scheduler process 16 and the faring process 18 can be found in co-pending U.S. patent applications entitled "Scheduler System for Travel Planning System", Ser. No. 09/109,622, filed on Jul. 2, 1998 by Carl G. Demarcken et al., and U.S. patent application entitled "Travel Planning System", Ser. No. 09/109,327, filed on Jul. 2, 1998 by Carl G. Demarcken et al, both of which are assigned to the assignee of the present invention and incorporated herein by reference.

The travel planning system also includes a plurality of databases 20a, 20b which store industry standard information pertaining to travel, for example, airline, bus, railroad, etc. Database 20a can store flight information from a source such as the Standard Schedule Information Manual, whereas database 20b can store the Airline Traffic Publishing Company (ATPCO) database of published airline fares and their associated rules, routings and other provisions. The databases 20a, 20b are typically stored locally and updated periodically by the remote resources 21a, 21b. In addition, the system 10 can access an availability system 66 of one or more airlines (generally each airline will have its own availability system) by sending availability queries over the network 22.

The system 10 also includes an availability predictor 65. The availability predictor 65 can be based upon a cache or database of stored availability queries, a predictive model of availability and/or a simulation of an availability process or an actual availability process running as a local process to the server process 12.

The system 10 also includes a plurality of clients 30a-30c implemented by terminals or preferably personal computers. The clients are coupled to the server 12, via a network 22, that is also used to couple the remote resources 21a-21b that supply databases 20a, 20b to the server 12. The network 22 can be any local or wide area network or an arrangement such as the Internet. Clients 30a, 30b are preferably smart clients. That is, using client 30c as an illustrative example, it may include a client computer system 32 including computer memory or storage medium 34 that stores a client process 36 and a set of pricing solutions. The set of pricing solutions 38 in one embodiment is provided from the server process 15 and comprises a set of fares that are valid for a journey and associated information linking the fares to the flight segments of the journey. In an alternative arrangement, the availability predictor 65 can be part of the client process 36.

The set of pricing solutions 38 is obtained from the server 12 in response to a user request sent from the client to the server 12. The server 12 executes the server process 15 using the scheduling process 16 and the faring process 18 as mentioned in the above-identified patent applications to produce the set of pricing solutions for a particular journey. If requested by a client, the server process will deliver the set of pricing solutions to the requesting client. Under control of the client process 36, the requesting client 30c can store and/or logically manipulate the set of pricing solutions to extract or display a subset of the set of pricing solutions, as a display representation on the monitor 40.

Figure 2:
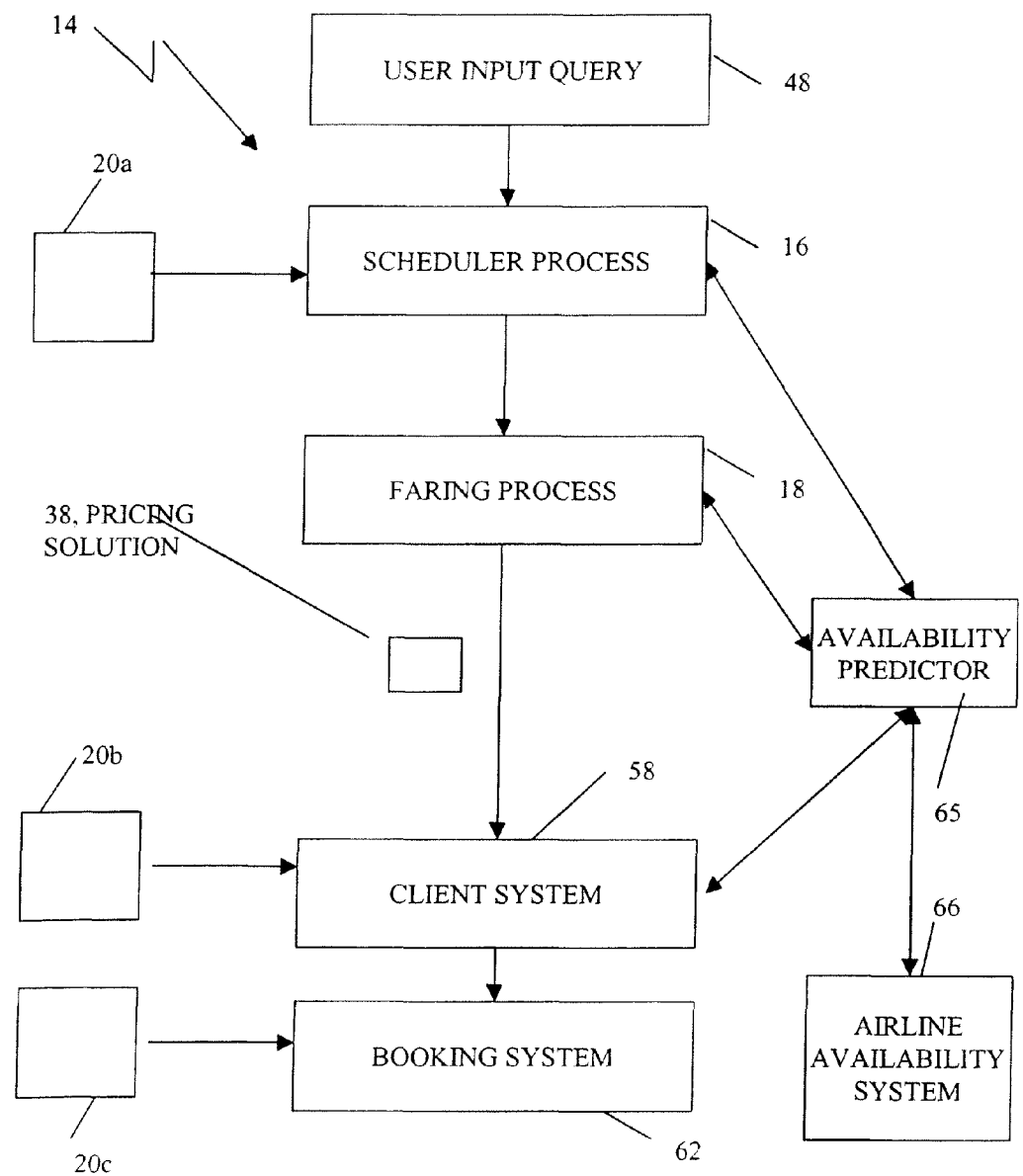
FIG. 2 is a flow chart showing a server process used in the system of FIG. 1.

Referring now to FIG. 2, the server process 18 is preferably executed on the server computer 12 but could be executed on the client 32. The server process 18 is responsive to a user input query 48. The user input query 48 would typically include minimal information needed to determine the set of pricing solutions. This information typically requires at a minimum an origin and a destination for travel. In addition, the information could also include times, dates and so forth. This query is fed to the scheduler process 16 that produces a large number of itineraries, that is, sequences of flight segments between the origin and destination of each slice of a journey. The scheduler process provides the itineraries to a faring process 18. The faring process provides a set of pricing solutions by finding valid fares corresponding to the itineraries produced by the scheduler process 16. The faring process 18 validates the fares for inclusion in the set of pricing solutions.

The server process 18 also includes an availability predictor 65 that is used to determine airline seat availability. The availability predictor 65 can be accessed after or during the scheduler process 16, faring process 18, or within the client system 58 to determine the availability of seats on a particular flight of a particular airline. The availability predictor 65 can be implemented using various techniques, as will be described below, which may include producing actual queries that are sent to an airline availability system 66. The answers received from the queries can be used to train the availability predictor 65. From the pricing solution information 38 and the availability information provided from the availability predictor 65, a client system or other system can access 58 a booking system 62 to issue a ticket for a customer.

Figure 3:
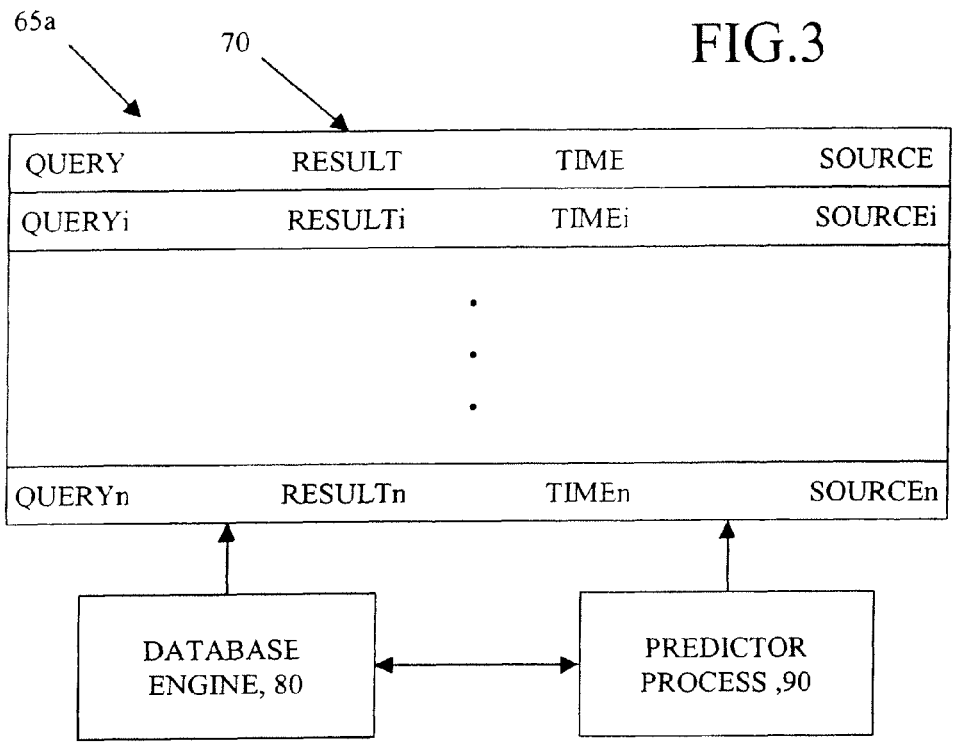
FIG. 3 is a block diagram of an availability database.

Referring now to FIG. 3, a first embodiment 65a of an availability predictor 65 includes a database 70, a database engine 80 and a predictor process 90. The database 70 stores availability queries and answers as shown. The database 70 includes queries and answers that were obtained by the availability predictor 65a when the availability predictor 65a could not trust or provide a prediction and thus issued an actual availability query, as well as, queries that are received from other sources. For example, the availability predictor can be run as part of a server process by a computer reservation service (CRS). The CRS may have access to availability queries that are run by travel agents, for example, that are associated with the computer reservation service. The queries and the results of these queries can be forwarded and stored in the database 70. The database 70 will contain the query such as shown below. For a query involving a single flight:

| Airl | Flt# | Orig | Dest | Date | TripOrigin | TripDest | SoldIn | SoldBy |
|------|------|------|------|---------|------------|----------|--------|-------------|
| AA | 1822 | BOS | DEN | 25MAR99 | BOS | LAX | US | Amer. Expr. | or for a query involving multiple flights:

| Airl | Flt | Orig | Dest | Date | TripOrigin | TripDest | SoldIn | SoldBy |
|------|------|------|------|---------|------------|----------|--------|-------------|
| AA | 1822 | BOS | DEN | 25MAR99 | BOS | LAX | US | Amer. Expr. |
| AA | 0421 | DEN | LAX | 25MAR99 | BOS | LAX | US | Amer. Expr. |

A result will generally comprise a message such as shown below:

| Airl | Flt# | Orig | Dest | Date | BookingCodes&Counts |
|------|------|------|------|---------|---------------------|
| AA | 1822 | BOS | DEN | 25MAR99 | F0 C0 Y9 M5 K5 L0 Q0 | or

| Airl | Flt# | Orig | Dest | Date | BookingCodes&Counts |
|------|------|------|------|---------|---------------------|
| AA | 1822 | BOS | DEN | 25MAR99 | F0 C0 Y9 M5 K5 L0 Q0 |
| AA | 0421 | DEN | LAX | 25MAR99 | F1 C0 Y4 M5 K1 L1 Q1 |

Additional information can be stored in the database 70 which may typically be generated by the availability predictor 65a. For example, the query can be stored along with an entry that corresponds to the time and/or date that the query was stored, received, and/or generated. The source of the query can also be noted. In addition, other information may also be stored with the query such as characteristics of the customer or traveler. Such characteristics may include the traveler's nationality, point of purchase or status such as whether the traveler is a frequent flyer or whether the traveler is booking other flights on the airline to which the query was directed and so forth. The database 70 can also be populated by routine direct queries even in the absence of queries made to the predictor so that, when a question is asked of the predictor, it is less likely that a direct query would have to be made. For example, the database 70 may be populated during off peak times for travel agents or may be simply populated with such routine queries when the system is not otherwise in use.

The database engine 80 populates the database 70. The engine 80 can produce queries of certain types depending upon the relative factors involved in any particular flight and/or airline. Such routine queries could be automatically produced by the database engine 80 for those markets and/or flights in which air travel is particularly heavy or during such periods of time where air travel between particular origins and destinations would be particularly heavy.

Figure 4:
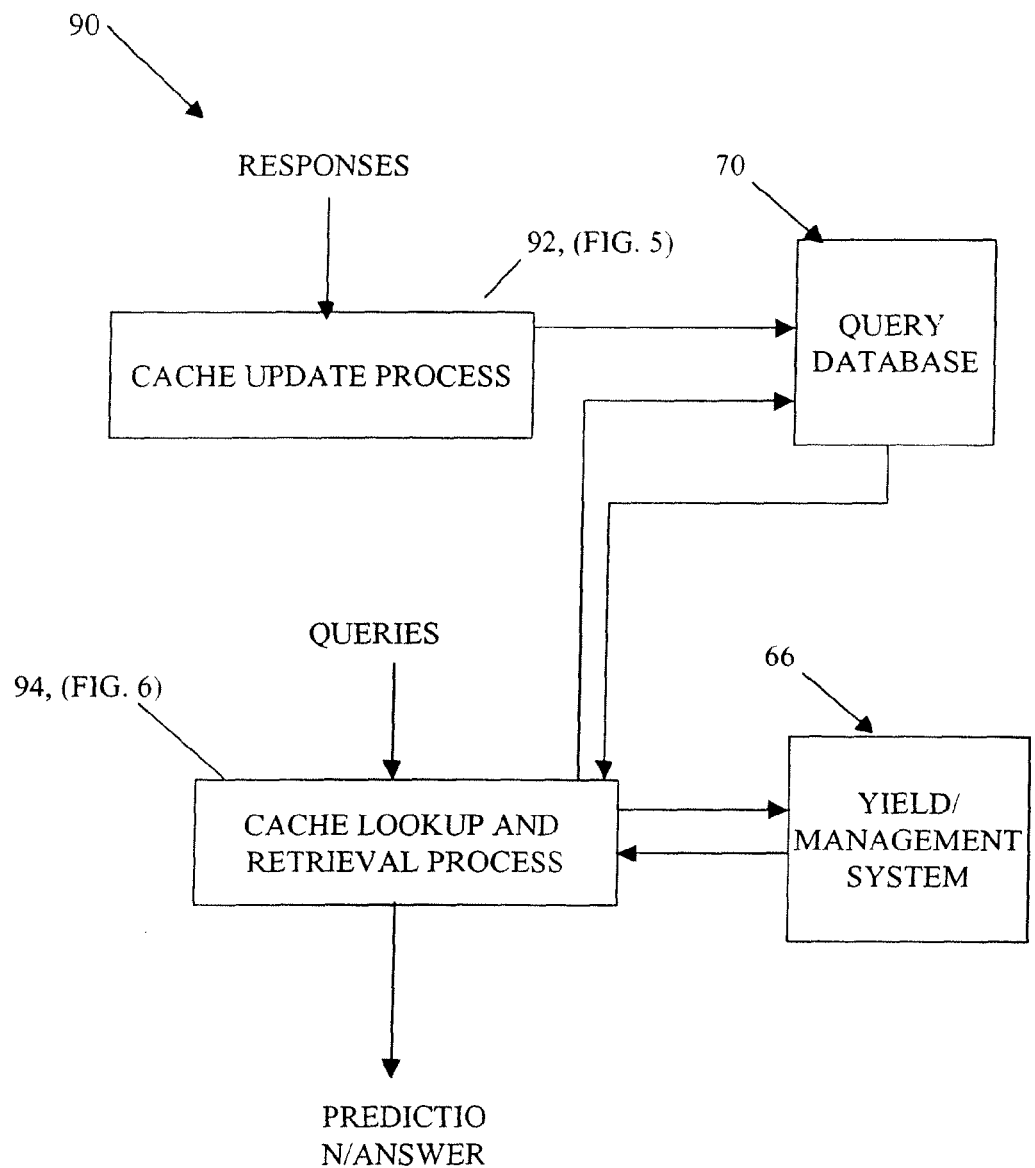
FIG. 4 is a block diagram of a predictor using the availability database of FIG. 4.

Referring now to FIG. 4, the predictor process 90 that uses the database 70 to provide predicted availability answers is shown. The predictor process 90 includes an update process 92 that interfaces with the query database 70 (FIG. 3) and database engine 80 to make sure that the query database 70 contains the most current information available for the availability predictor 90. The update process 92 takes responses that are received from queries made by the availability predictor 90, as well as other sources, and populates them into the query database 70 as appropriate. The predictor 90 also includes a look-up and retrieval process 94 that interfaces with the query database 70, as well as the yield management (availability) system 66 (FIG. 2) that is coupled in a conventional manner to an airline availability system. In response to a query, the look-up and retrieval process 94 produces either a prediction for the answer of the query or an actual answer depending upon whether the look-up and retrieval process retrieves an answer from the database 70 or the yield management system 66.

Figure 5:
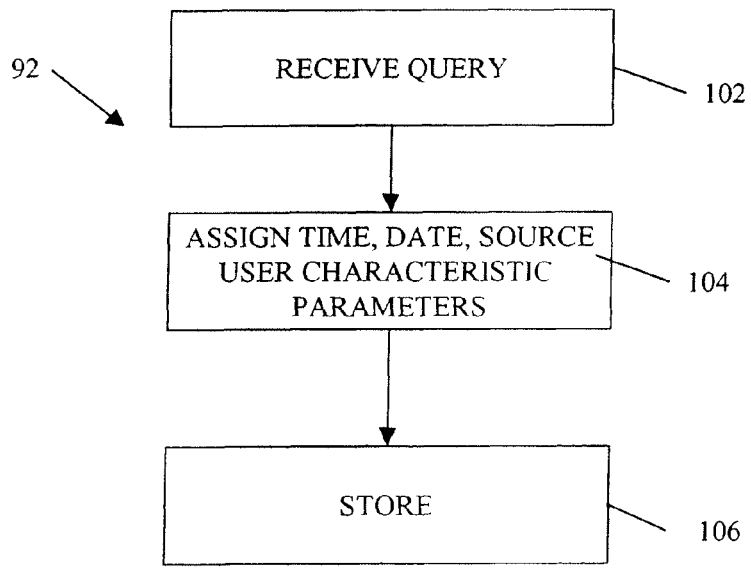
FIGS. 5 and 6 are flow charts of processes used with the availability database.

Referring now to FIG. 5, the update process 92 receives a query 102 from either the availability predictor 90 or from other sources, as described in conjunction with FIG. 3. The update process 92 assigns 104 a time, date, source, and user characteristic parameters, if available, as appropriate and stores 106 the query along with the answer and the assigned parameters in the query database 70.

Figure 6:
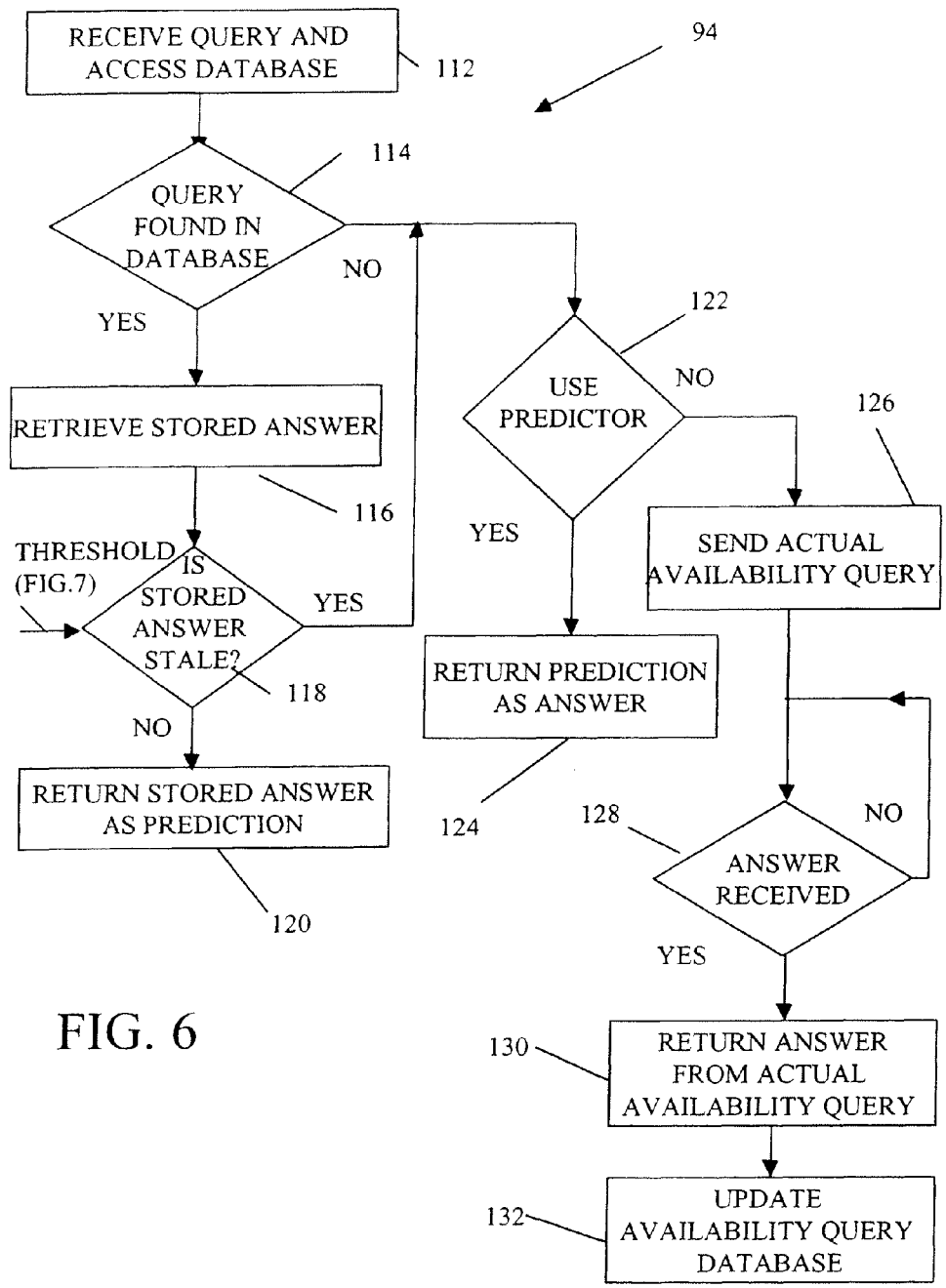

Referring now to FIG. 6, the look-up and retrieval process 94 receives a query that may have originated from the server process 15. The server process 15 may have a series of flights, fares and/or linked combinations thereof, for which availability information is needed. The server process 15 can construct an availability query for flight-segments it is using or considering using by collecting necessary information from the scheduling database 20*a*. The information can include airline, flight number or numbers, origin and destination airports, and travel date. In addition, the information can also include trip origin and destination if different than the origin and destination of the queried flight-segments. Queries may also include information about the selling location or agency. For travel involving multiple flight-segments, individual queries may be constructed for each flight segment, or a single query for multiple flight-segments might be constructed. The server process 15 sends the query to the availability predictor 65*a*.

Figure 7:
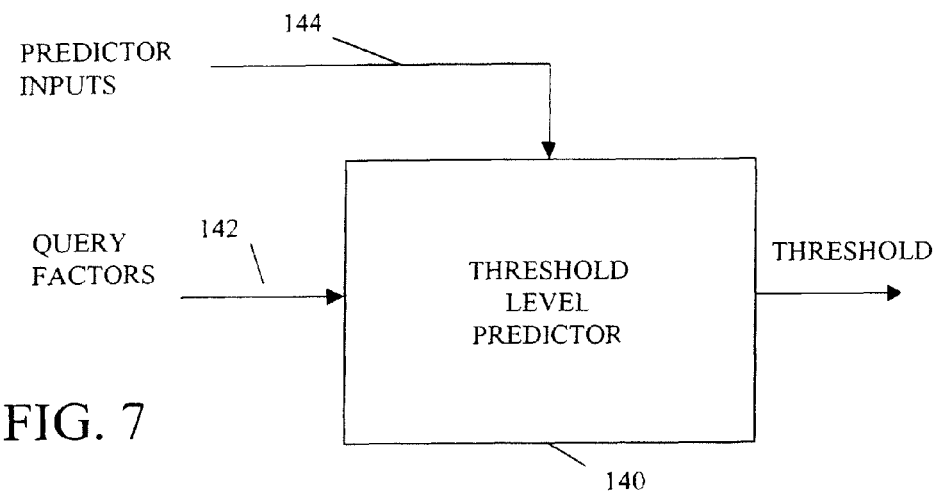
FIG. 7 is a block diagram of a threshold level predictor.

The look-up and retrieval process 94 will look up 112 the received query in the query database 70 by attempting to match the query fields such as airline, flight number/numbers, date, trip origin and destination, sale location and agency. If a stored query is found 114 in the query database 70 that matches the received query or which is substantially close in characteristics to the received query, the process 94 will retrieve 116 the stored answer. The process 94 will determine if the stored answer is stale 118 by comparing the time of the query to a threshold time that can be either a preset threshold such as a certain number of minutes, hours or days or preferably a variable threshold that is determined in accordance with a threshold level predictor 120 (FIG. 7). If the answer is not stale, then the look-up and retrieval process 94 will return 120 the stored answer as a prediction of the availability of a seat on a particular flight according to the availability query.

If the query was not found in the database 70 or if the stored query which was found is stale, the look-up and retrieval process 94 optionally can determine 122 whether or not to use another predictor such as one of the predictors to be described in conjunction with FIGS. 8-11. If the look-up and retrieval process 94 has this option, the process 94 will return 124 the prediction from those predictors, as the prediction from the availability predictor 65*a*. Otherwise, if the look-up and retrieval process 94 does not have a predictor or does not trust the predictor, then the process can send 126 an actual availability query to the airline availability system 66 (FIG. 2). The answer that is received 128 from the airline availability system 66 is returned 130 as the answer and can be used to update 130 the database 70. The database 70 can be implemented using various approaches including hierarchal, relational or object oriented databases, or alternatively, a software or hardware cache. In addition, the answer can include a confidence factor based on whether the query is stale or whether an actual query was performed.

Referring now to FIG. 7, a threshold level predictor 140 is shown. The threshold level predictor 140 can be fed by query factors 142 such as the date of a flight, origin and destination of the flight, size of the airplane and so forth and also fed by predictor inputs 144 that determine relative weights, for example, to assign to each one of the query factors. The threshold level predictor 140 can determine a threshold time interval that can change over time. The threshold level predictor 140 can be used by the look-up and retrieval process 94 to determine whether a stored query is stale. The threshold level predictor 140 can be a mechanism that models or predicts a rate at which seats are reserved on a particular airline given the inputs or the time that an airline adjusts parameters that affect how availability seats are distributed among various booking codes. The model can take into consideration historical rates at which flights or families of flights are sold on different dates, aircraft capacity, external events such as strikes or sales and so forth.

Figure 8:
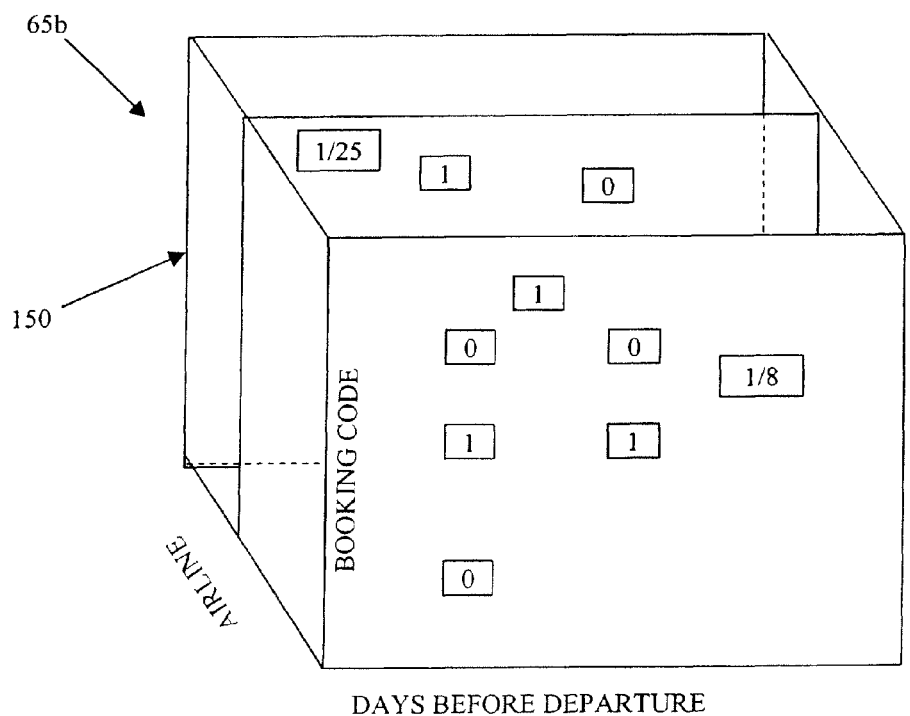
FIG. 8 is a block diagram of an availability table.

For a very simple example, the threshold predictor 140 could be a table similar to FIG. 8 that includes for every airline/booking-code/days-before-departure entry, a number of hours after which a database answer will be considered stale. This table could be trained on historical data by recording for each airline/booking-code/days-before-departure combination the average maximum number of hours prior to a query that other queries returned the same answer. For example, if in the past on American 3 days before departure in booking code Q, query answers remained the same for an average of 8 hours, then 8 hours would be stored in the table, and database queries for AA/Q/3-days-before-departure would be considered stale if they were more than 8 hours old.

Several options are provided for returning the predictions and/or answers from the look-up and retrieval process 94. For example, the look-up retrieval process 94 can simply return a true/false indication indicating that a seat conforming to the parameters of the query is available or is not available. Alternatively, the look-up and retrieval process 94 can return a probability estimate of availability of a seat conforming to the parameters of the query. In addition, the predictions can return a true/false indication or a probability on a booking code basis.

In addition to being populated with direct queries made by the availability predictor or queries that are obtained from other sources, additional types of query messages can also be used to populate the query database 70. For example, in many countries it is common for airlines to send out so-called "AVS" (available seat) messages which are distributed from certain airlines, particularly in foreign countries, to other airlines or computer reservation systems. AVS messages specify for a given flight segment whether there are seats remaining on that flight. Sometimes those messages can specify seating on a per booking code basis. Not all airlines use the AVS message process and, therefore, its use in the database would be limited to the availability of such messages for any particular flight segment and airline. Nevertheless, this could be an additional mechanism used to improve the data that is stored in the query database.

Referring now to FIG. 8, a table predictor 65*c* is shown. The table predictor 65*c* can be in the form of a three-dimensional table that is stored in computer memory. This is only an example. The table does not have to be three dimensional, and the axes could be different features of an availability query. The table can be indexed by any number of the features of the query. In this example, the table can correspond to the following: the X axis can be a time axis specifying days or hours before departure, the Y axis can be airlines and the Z axis can be booking codes.

The table 150 could have 0's or 1's entries 152 corresponding to not available/available. Alternatively, these entries 152 could also be probability estimates (not shown). This table 150 could be populated by historical information about how often booking codes were available in the past for the airline/booking-code/days-before-departure. For example, if over the past few months availability queries for AA flight 66 that were sent 3 days in advance of travel had booking code Q available 80% of the time, then the probability 0.8 could be stored in the table. When using the predictor 65*b*, 0.8 could be returned for AA/3 day/Q queries, or if an available/not-available answer was desired, "available" could be answered because 0.8>0.5. In addition, the table could also be populated with the number of seats 154 that might be available on a booking code basis. This can be determined from historical information. The table predictor may also store a number that corresponds to the number of actual queries that were used to arrive at the probability estimate. This number can be used to produce a confidence factor that is returned with the predictor.

Figure 9:
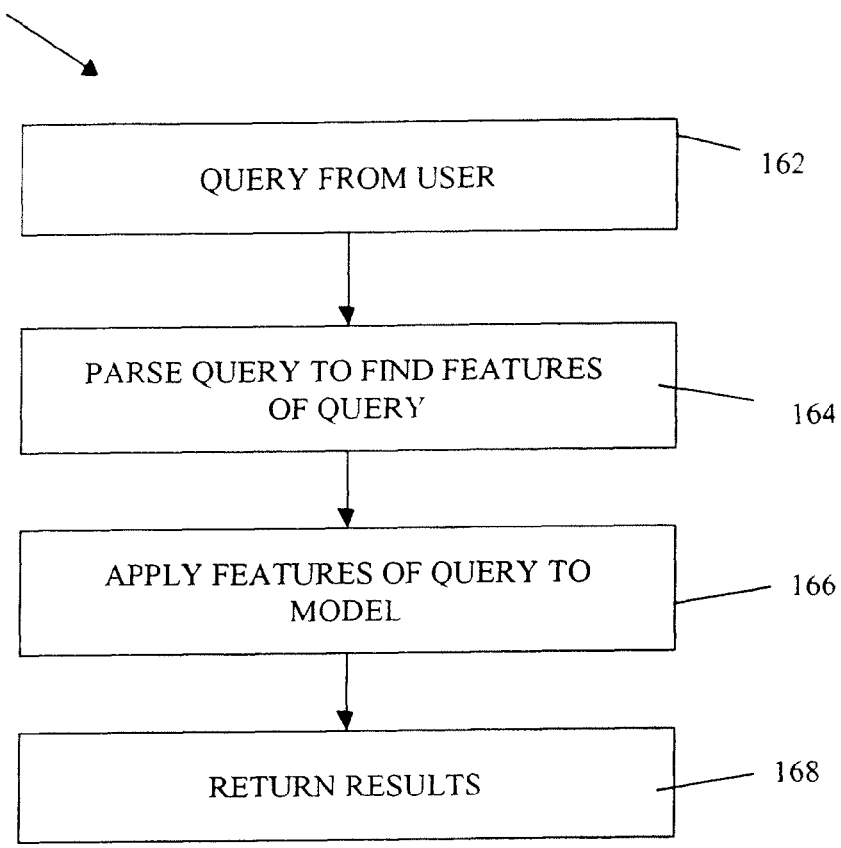
FIG. 9 is a block diagram of an availability predictor.
Figure 9A:
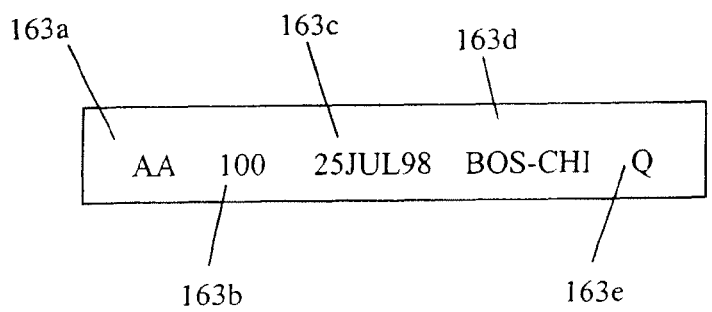
FIG. 9A is a diagram showing an exemplary query.

Referring now to FIG. 9, a model-based predictor embodiment 65c of the availability predictor 65 is shown. The model-based availability predictor 65c receives 122 a query from a user. The query 163, as shown in FIG. 9A, includes information including an airline 163a, a flight number 163b, a date 163c, an origin and destination (or city pair) 163d, as well as, one or more booking codes 163e. In addition, the query 163 may include other information including point of sale, sales agent, possibly multiple flight numbers, possibly a trip origin and trip destination (as opposed to just the origin/destination of the flights being queried). The query 163 is parsed and analyzed 164 by the model-based availability predictor 65c to find features or characteristics of the query 163. That is, the query 163 is broken down to features such as flight number type, period of flight, origin and destination types, the length of time before the flight departs, travel times in the query, and so forth. In addition, the aircraft and capacity, as well as, external events such as sales and strikes, historical availability, and traffic on other flights properties of the traveler and so forth.

For a sample query 163 "UA 100 25JUL98 BOS-CHI Q", the availability predictor can parse 164 that into the following information: the query 163 is for a United Airlines flight, a major carrier, having a flight number 100, a "low number flight", that the date of the flight is in "the summer", and that the flight is between "two major" cities. The query can determine that the requested fare is a "low cost" fare for Q booking code. In addition, although not present in this query, other factors could also be present in a typical availability query. For example, if the booking code was Y that would indicate a high cost fare. If the flight number is 7500, that could indicate a high flight number and if the origin and destination were "DLH-HIB" (Duluth to Hibbing), that could indicate a flight between two small cities.

Among the features that the availability predictor 65c may take into account are entries in a database of recent or historical fares such as database 70 (FIG. 3). Two features of a query may be "is there a query in the database 70 (FIG. 3) for a similar flight on the same day where the booking code is available" or "is there a query in the database for the same flight on the same day where the booking code is available." The answers in the database 70 (FIG. 3) may be too old to return as an answer, but the information may still be useful in the statistical predictor 65c. This is noted in FIGS. 6 and 10 by the paths between the database and the predictor.

The availability-predictor 65c applies 166 the positive, that is, present features of the query to a model and the model returns 168 a prediction of availability corresponding to the query. The results that could be returned from the query may be, for example, a simple "yes", "no", i.e, 1,0 binary return, which indicates either a seat is available or not available or, alternatively, the model may return a number which is or can represent a probability that a seat is available or not available.

Figure 10A:
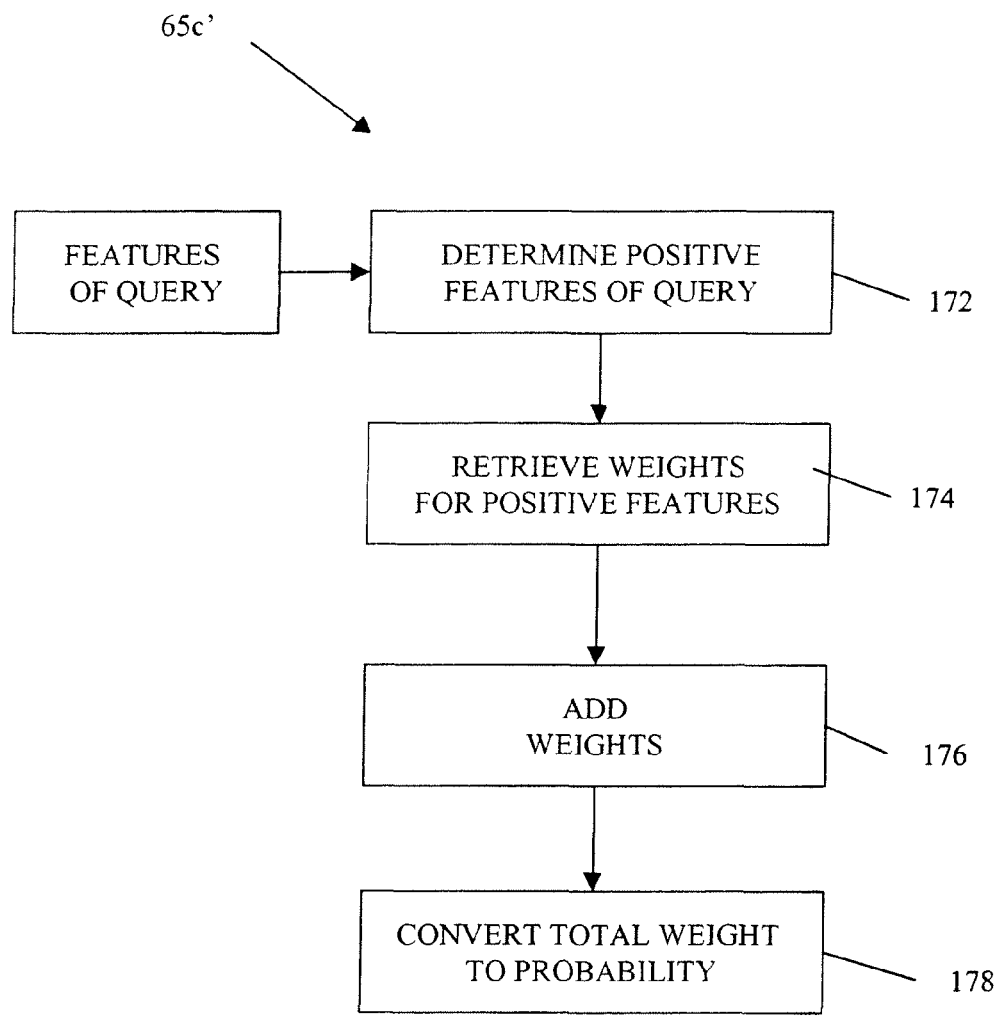
FIG. 10A is a block diagram of an availability predictor of FIG. 3 using an exponential modeling algorithm.

Referring now to FIG. 10A, one embodiment 65c' of the model-based availability predictor 65c is shown. The predictor 65c' determines 172 positive features of the query. The predictor 65c' retrieves 174 weights for the positive features with the weights either set in accordance with expert understanding of airline's availability, or, automatically from historical data. In this case, algorithms for setting the weights can be found in various statistics and "machine learning" textbooks such as "Neural Networks for Pattern Recognition" by Christopher Bishop, Oxford Press.

One such algorithm is called "gradient descent" and is approximately as follows:

1. For each feature F, set its weight W(F) to 1.
2. Calculate for each feature F the number of historical queries that returned "available" that the feature occurred in, and call it H(F). (For example, if an American Airlines feature (AA) occurred in 200 queries that were available, then let H(AA)=200).
3. Using the current weights, calculate for each historical query H the probability P(H) of it being available, using the same equations used for normally predicting availability: $P(H)=\exp(X)/(1+\exp(X))$ where X=sum W(F) for all features F in H.
4. For each feature F, calculate the number of times the current model predicts it will occur in available queries, M(F), by summing P(H) over each historical query H that includes the feature F.
5. Calculate for each feature F the difference between the known number of times the feature appeared in historical queries, H(F), and the predicted number, M(F), and if for each feature the difference is less than a threshold, stop training and use the current weights.
6. Otherwise, update each feature F's weight W(F) using the formula $W(F) \leftarrow W(F)+K*(H(F)-M(F))$ where K is some small constant like 0.01.
7. Go to 3 until all weights have been determined.

The availability predictor 65c' assigns the weights to the positive factors and adds 176 them to produce a total weight number. The total weight is converted 178 to a total probability. One technique to convert the weight sum to a total probability uses an exponential model of the form $e^x/(1+e^x)$, where x is the total weight number. Alternative models include a linear or quadratic discriminator, factorial model, decision tree, decision list, neural network, sigmoidal network, Bayesian network, naive Bayesian network, Markov random field, maximum entropy model, exponential or log linear model, nearest neighbor model, radial basis model or support vector model and so forth. All of these other models assume that there are features, but not necessarily that the features have weights that are summed.

Figure 10B:
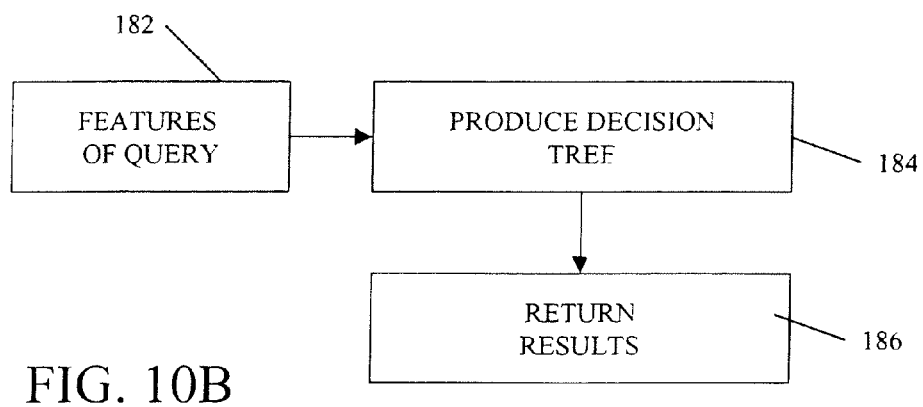
FIG. 10B is a block diagram of an availability predictor using a decision tree algorithm.

Referring now to FIG. 10B, an alternative embodiment 65c'' of the model-based availability predictor 65c (FIG. 8) takes 182 features of the query and uses 184 a decision tree to evaluate the query. From the decision tree, a predicted answer to the query is returned 186. A decision tree is another type of classifier, already listed above. As weights are computed ahead of time in the exponential model the "decision tree" is built ahead of time from historical data. The decision tree is used to predict by following branches appropriate for a given query's features and then returning the probability/answer found at the leaf of that the tree the branches lead to. The decision tree is built from historical data.

Figure 11:
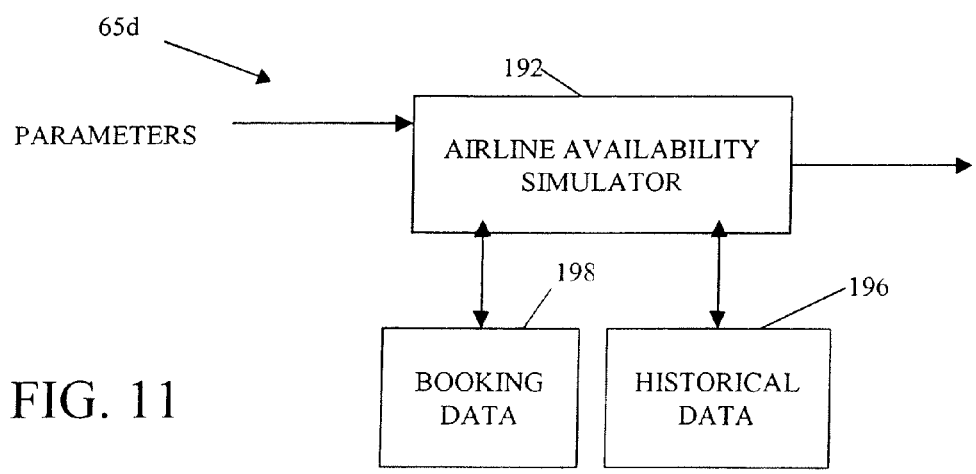
FIG. 11 is a block diagram of an availability predictor that simulates an airline availability system.

Referring now to FIG. 11, an alternative mechanism 65d for an availability predictor 65 includes an airline availability processing system simulator 192. As mentioned previously, generally airlines have an availability system 66 (FIG. 1) that depends upon various considerations as to whether or not an airline will indicate that a seat is available in response to a given query. The airline availability system implements an airline's complex selling policy in order to maximize profit on a given flight.

The simulator 192 can follow the same considerations that the airline uses in determining whether or not a seat is available for a given flight. The simulator 192 can be constructed by making use of parameters provided by airlines or estimated independently of the airline on the basis of direct available queries or predicted from external factors such as dates, passengers, traffic flow and so forth. These parameters can include parameters that control the allocation of empty seats amongst various booking codes, as well as databases of actual flight capacities and reservation counts. In an alternative arrangement, an airline may provide the availability system that can run as a local process within the server process 15 to produce actual availability answers without the need for transmitting messages over the computer network 22.

The simulator 192 can be the actual yield management program used by an airline or more likely would be a program that is constructed to model the yield management system used by the airline. The simulator 192 can use historical data 196, i.e., historical direct queries and answers, as well as current bookings 198. The airline may, on a regular or per query basis, provide to the simulator 192 information about any parameters that the airline uses to control the responses to availability queries including, for example, the expected profit margins for booking codes, expected rate at which seats on flights are sold at or will be reserved for, and the number of seats currently reserved or sold on individual flights. These parameters may be estimated by the predictor on a regular or per query basis, based on answers to previous direct queries or knowledge of external factors such as the query time and date, the flight time and date, airline sales or other promotional activities, strikes or service outages on the airline, or other airlines and so forth.

This process would be useful since, rather than having an airline transmit parameters to the predictor over a computer network which may be time consuming and expensive, it may be desirable that the airline provide information or in fact the actual yield management system directly to the availability predictor such that the process can be simplified and made more efficient.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A computer implemented method of providing a seat availability prediction in response to a seat availability query, the method comprising:
receiving a query for seat availability data, the query specifying characteristics of a specific flight;
determining: by one or more computer systems: from the query, seat availability query factors comprising an airline, a booking code, and a number of days prior to a date of travel;
accessing, by one or more computer systems, a data structure stored in memory, the data structure configured to store seat availability answers derived from past seat availability queries, and the data structure indexed at least according to the seat availability query factors; and
retrieving, by one or more computer systems, from the data structure, using the seat availability query factors, a probability that a seat is available for the flight and booking code;
comparing the retrieved probability that a seat is available to a predetermined threshold probability;
determining that the retrieved probability that a seat is available satisfies the predetermined threshold probability; and providing a response to the query indicating that a seat is available for the flight and booking code.

2. The method of claim 1 wherein the data structure is a table stored in memory with dimensions of the table corresponding to the indexes of the seat availability query factors.

3. The method of claim 1 wherein the seat availability query includes one or more fields that specify at least one of points of travel, dates of travel, times of travel, class of travel, or booking code.

4. The method of claim 1 wherein the seat availability query factors further comprise a flight number.

5. The method of claim 1 wherein at least some of the seat availability answers correspond to a yes/no value.

6. The method of claim 1 wherein at least some of the seat availability answers correspond to a number of available seats on a specified flight.

7. The method of claim 4 wherein at least some of the seat availability answers correspond to a number of available seats according to booking code.

8. The method of claim 1 wherein at least some of the seat availability answers are text-based answers.

9. The method of claim 2 wherein the table is a three-dimensional table stored in computer memory, wherein dimensions of the table correspond to an index for time that specifies days or hours before departure, an index for airlines and an index for booking codes.

10. The method of claim 2 wherein seat availability entries in the table are determined from historical information related to how often booking codes were available for previous availability queries for combinations of airline/booking-code/and days-before-departure.

11. The method of claim 2 wherein seat availability entries in the table are probability estimates and the seat availability entries are associated with confidence factors that are related to the number of actual seat availability queries that were used to arrive at the probability estimates.

12. A computer program product tangibly embodied on a non-transitory computer readable storage medium for providing a seat availability prediction of seat availability in response to a seat availability query, the computer program product comprising instructions for causing a one or more computers to:
receive a query for seat availability data, the query specifying characteristics of a specific flight;
determine from the query seat availability query factors comprising an airline, a booking code, and a number of days prior to a date of travel;
access a data structure stored in a memory of a computer system, the data structure storing seat availability answers, the seat availability answers derived from past seat availability queries and indexed at least according to the seat availability query factors; and
retrieve from the data structure, using the seat availability query factors, a probability that a seat is available for the flight and booking code;
compare the retrieved probability that a seat is available to a predetermined threshold probability;
determine that the retrieved probability that a seat is available satisfies the predetermined threshold probability; and
provide a response to the query indicating that a seat is available for the flight and booking code.

13. The computer program product of claim 12, further comprising instructions to: receive the seat availability query that includes one or more fields that specify at least one of points of travel, dates of travel, times of travel, class of travel, or booking code.

14. The computer program product of claim 12 wherein the seat availability query factors further comprise a flight number.

15. The computer program product of claim 12 wherein at least some of the seat availability answers correspond to a yes/no value.

16. The computer program product of claim 12 wherein at least some of the seat availability answers correspond to a number of available seats.

17. The computer program product of claim 12 wherein at least some of the seat availability answers correspond to a number of available seats according to booking code.

18. The computer program product of claim 12 wherein at least some of the seat availability answers are text-based answers.

19. The computer program product of claim 12 wherein the data structure is a three-dimensional table stored in computer memory, with dimensions of the table corresponding to an index for time that specifies days or hours before departure, an index for airlines and an index for booking codes.

20. The computer program product of claim 19 wherein seat availability entries in the table are determined from historical information related to how often booking codes were available for previous seat availability queries for combinations of airline/booking-code/and days-before-departure.

21. The computer program product of claim 19 wherein seat availability entries in the table are probability estimates and the seat availability entries are associated with confidence factors that are related to the number of actual seat availability queries that were used to arrive at the probability estimates.

22. The computer program product of claim 21 comprises instructions to:
 return the confidence factor with the probability estimate of seat availability.

23. The computer program product of claim 12, further comprising instructions to:
 populate the data structure with historical information about how often booking codes were available for an airline/booking-code/days-before-departure combination.

24. A computer system for providing a predicted answer in response to a seat availability query from a user, the computer system comprising:
 a processor; and
 a computer readable medium storing a computer program product comprising instructions for causing the computer system to:
 receive a query for seat availability data, the query specifying characteristics of a specific flight;
 determine, from the query, seat availability query factors comprising an airline, a booking code, and a number of days prior to a date of travel;
 access a data structure stored in a memory of a computer system, the data structure storing seat availability answers, the seat availability answers derived from past seat availability queries and indexed at least according to the seat availability query factors; and
 retrieve from the data structure, using the seat availability query factors, a probability that a seat is available for the flight and booking code;
 compare the retrieved probability that a seat is available to a predetermined threshold probability;
 determine that the retrieved probability that a seat is available satisfies the predetermined threshold probability; and
 provide a response to the query indicating that a seat is available for the flight and booking code.

25. The computer system of claim 24, wherein the seat availability query includes one or more fields that specify at least one of points of travel, dates of travel, times of travel, class of travel, or booking code.

26. The computer system of claim 24, wherein the data structure is a three-dimensional table stored in computer memory, with dimensions of the table corresponding to the indexes including an index for time that specifies days or hours before departure, an index for airlines and an index for booking codes.

27. The computer system of claim 24 wherein at least some of the seat availability answers corresponds to a yes/no value.

28. The computer system of claim 24 wherein at least some of the seat availability answers corresponds to a number of available seats.

29. The computer system of claim 24 wherein at least some of the seat availability answers correspond to a number of available seats according to booking code.

30. The computer system of claim 24 wherein the seat availability factors further comprise a flight number.

31. The computer system of claim 24 wherein at least some of the seat availability answers correspond to a qualitative measure of seat availability.

32. The computer system of claim 24 wherein the data structure is a three-dimensional table stored in computer memory, with dimensions of the table corresponding to an index for time that specifies days or hours before departure, an index for airlines and an index for booking codes.

33. The computer system of claim 32 further comprising instructions to:
 determine the seat availability answers from historical information related to how often booking codes were available for previous seat availability queries for combinations of airline/booking-code/and days-before-departure.

34. The computer system of claim 32 wherein the seat availability answers are associated with confidence factors that are related to a number of actual seat availability queries that were used to arrive at the probability estimates.

35. The computer system of claim 32 further comprising instructions to: return a confidence factor with the probability estimate of seat availability.

\* \* \* \* \*

UNITED STATES PATENT AND TRADEMARK OFFICE
CERTIFICATE OF CORRECTION

PATENT NO. : 8,560,356 B2  
APPLICATION NO. : 12/194592  
DATED : October 15, 2013  
INVENTOR(S) : Carl G. DeMarcken and Gregory R. Galperin Page 1 of 1

It is certified that error appears in the above-identified patent and that said Letters Patent is hereby corrected as shown below:

In the Claims

Column 11, Line 50, replace "determining:" with -- determining, --

Column 11, Line 50, replace "systems:" with -- systems, --

Column 12, Line 30, replace "booking-code/and" with -- booking-code and --

Column 12, Line 45, replace "query seat" with -- query, seat --

Column 13, Line 25, replace "booking-code/and" with -- booking-code and --

Column 14, Line 46, replace "booking-code/and" with -- booking-code and --

Signed and Sealed this  
Third Day of June, 2014

Michelle K. Lee  
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,560,356 B2 | Page 1 of 1 |
| APPLICATION NO. | : 12/194592 | |
| DATED | : October 15, 2013 | |
| INVENTOR(S) | : DeMarcken et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 825 days.

Signed and Sealed this
Tenth Day of March, 2015

Michelle K. Lee
*Deputy Director of the United States Patent and Trademark Office*